United States Patent Office

3,395,069
Patented July 30, 1968

3,395,069
BONDING OF ORGANIC RESINS TO SILICEOUS MATERIALS
Edwin P. Plueddemann, Midland, Mich., assignor to Dow Corning Corporation, Midland, Mich., a corporation of Michigan
No Drawing. Filed Oct. 15, 1964, Ser. No. 404,168
20 Claims. (Cl. 161—193)

ABSTRACT OF THE DISCLOSURE

Process of bonding an organic polymer such as, thermoplastic resins to an inorganic substrate such as, siliceous materials imparting no discoloration to said resins and improving the strength between the two members giving it hydrolytic stability. An illustrative example being the treatment with 0.5% aqueous solution of $$ClCH_2CH_2CH_2Si(OCH_3)_3$$

upon 2½" x 4" Pyrex glass plate and drying it briefly in a 100° C. oven. On the glass plate, so treated, is laid a sheet of compounded styrene-butadiene rubber tread stock. This is then pressed at 1500 p.s.i. and 320° F. for 20 minutes.

---

This application relates to a new method of bonding organic polymers to inorganic substrates such as glass, quartz, silica, ceramic, silicone rubber, silicone resins, aluminum, steel, copper, alumina, magnesium oxide, cement, stone, etc.

The bonds formed by the method of this application exhibit increased strength and hydrolytic stability. This invention has particular utility for use with the thermoplastic resins, since there are few methods known for bonding thermoplastic resins to siliceous materials with a bond that is hydrolytically stable and which has satisfactory strength. For this reason, manufacturers have been forced to use the more expensive thermosetting resins in applications where thermoplastic resins would be suitable but for their poor bonding characteristics.

An object of this invention is therefore to improve the bonding characteristics of thermoplastic resins in order that they can replace thermosetting resins in many applications. The process of this invention can accomplish this object without the discoloration of the resin that often occurs with other bonding processes.

This invention is also useful for bonding organic rubbers and thermosetting resins to inorganic substrates.

This application relates to the process of bonding (a) an organic polymer to (b) an inorganic substrate comprising (1) applying to the surface of at least one of (a) and (b) a material (c) selected from the group consisting of compounds of the formula

and hydrolyzates thereof where R is a monovalent hydrocarbon radical of no more than six carbon atoms, R' is a hydrolyzable group, Q is an organic radical containing atoms selected from the group consisting of carbon, hydrogen, and oxygen, and having a valence of $m+1$, Q being bonded to the silicon atom by a silicon-carbon bond, X is selected from the group consisting of chlorine, bromine, and iodine atoms which are attached to saturated carbon atoms, $n$ has a value of 1 to 3, $m$ has a value of at least 1, $b$ has an average value of 0 to 2, and $a$ has an average value of 0.1 to 3, the sum of $a$, $b$ and $n$ being 4, and the carbon atoms in Q which are alpha and beta to a silicon atom being each bonded to no more than one X atom, (2) bringing (a) and (b) into contact with each other with (c) between them, (3) applying energy to the composite of (a), (b), and (c) until a bond is formed between them which is superior in strength and hydrolytic stability to a bond between (a) and (b) alone.

Any solid, organic polymer is suitable for use in this process, e.g. thermoplastic and thermosetting resins such as polystyrene, poly(styrene-acrylonitrile), polyethylene, polypropylene, polyamide resins, poly(ethylene-terephthalate), polycarbonate resins, alkyd resins, polyester resins, silicone resins, polyvinyl chloride, copolymers of vinylchloride and vinylidene chloride, polyvinyl acetate, polyisoprene, poly(acrylonitrile-butadiene-styrene), polyformaldehyde, melamine resins, melamine-alkyd resins, acrylic resins, phenolic resins, amine-cured epoxy resins; and organic rubbers such as natural rubber, styrene-butadiene rubber, stero-regular cis polybutadiene, polyisoprene, ethylene-propylene copolymers, ethylene-propylene-diolefin terpolymers, polyacrylate rubbers such as copolymers of ethylacrylate and beta-chloroethylvinylether, butyl rubber, and butadiene-acrylonitrile rubber.

Any solid, inorganic material can be used in this process, e.g. siliceous materials such as glass sheets, glass fibers, glass cloth, glass powder, silica powder, quartz fibers, ceramic sheets, stone, cement, silicone rubber, and silicone resins; and other inorganic materials such as metals and metal oxides.

By "solid" is meant the solid phase; i.e. elastomeric as well as rigid. Furthermore, "solid" refers to the product after cure; it does not exclude the use of fluid forms of (a) and (b) in the making of bonded product.

The silicone composition (c) can be applied to the surface of either or both of (a) and (b) in pure form, in aqueous or organic solution, by vapor phase addition, or as an aqueous or organic emulsion. The manner of application is not critical; if either (a) or (b) is in a fluid or plastic form before cure, ingredient (c) can often be mixed into the substrate, if sufficient quantity of (c) is used so that a substantial amount of (c) is found at the surface of the substrate. Such a process is considered to constitute "applying" (c) to the surface, and is often desirable for use with organic rubbers.

It is believed that adsorbed water on the solid, inorganic substrate, which is always present under normal conditions, reacts with hydroxyl or hydrolyzable groups bonded to (c) to form a bond between (c) and the inorganic substrate used. A fully-condensed hydrolyzate of (c) can, however, be baked onto the inorganic substrate, and partially condensed hydrolyzates of (c) can bond to anhydrous inorganic substrates.

R can be any monovalent hydrocarbon atom of no more than six carbon atoms such as methyl, ethyl, isopropyl, vinyl, ethynyl, hexyl, cyclopentyl, cyclohexenyl and phenyl.

R' can be any hydrolyzable group known to the art, e.g. alkoxy groups such as methoxy, ethoxy, or butoxy; halogen atoms such as chlorine and bromine, alkoxyalkoxy groups such as beta-ethoxyethoxy, ethoxymethoxy, and methoxymethoxy; acyloxy groups such as the acetoxy and the propionoxy groups, dialkyl-substituted isocyanoxy groups such as

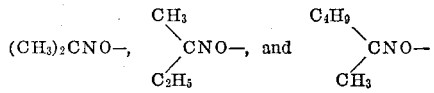

and the isocyanate group.

Q can be any organic radical of valence $m+1$, but all free valences except for the Si—Q valence are required to be on saturated carbon atoms. A further limitation of Q is that the alpha and beta carbons to the silicon atom can have no more than one free valance, not counting the valence to the silicon atom. The other valences are, of course, satisfied by X groups.

A representative list of Q groups with attached X groups is, therefore,

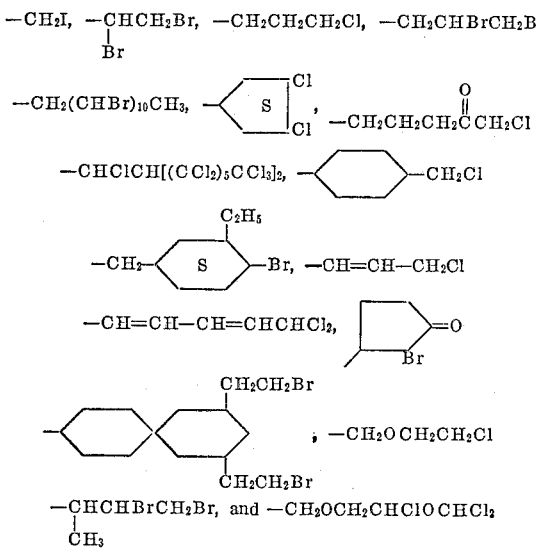

—CHCHBrCH₂Br, and —CH₂OCH₂CHClOCHCl₂
    |
    CH₃

It is preferred for *n* to have a value of 3.

Ingredient (c) can be a mixture of silanes or a cohydrolyzate as well as a single silane or hydrolyzate. A minimum of 1 out of 10 silicon atoms must possess a —QX$_m$ group, and the average number of silicon substituents present per molecule must be within the limits shown above.

The amount of ingredient (c) that must be added is not critical, but the strength and hydrolytic stability of the bond will increase as more of (c) is added until a maximum strength is reached. It is believed that this maximum is achieved when ingredient (c) covers its substrate in roughly a monomolecular layer. The strength of the bond may fall again from this maximum if an excess of (c) is used.

Step (2) of the process of this invention can be performed in many ways. If glass cloth or metal sheets are used, ingredient (c) can be placed on the glass cloth or metal, and sheets of (a) can then be placed against the cloth or metal; or the sheets of (a) can be treated with (c) to obtain the same result. Laminates can be formed in this manner.

Glass cloth or cloths which are treated with (c) can be immersed in a concentrated solution of (a), and the solvent can be removed to form a laminate.

Molding compounds and filled rubbers can be made by adding materials such as silica, alumina, glass powder, or glass or quartz fibers, all of which are treated with (c), to an organic resin or rubber in a plastic phase.

Objects which are made of organic resin or rubber can be treated with (c) and brought into contact with silicone rubber in a plastic phase. The silicone rubber then can be cured at a temperature below the resin melting point or the rubber decomposition point to form a solid composite or laminate.

These above examples are but a few of the more important variations of step (2). They are by no means the only methods of performing step (2).

If desired, the substrate with ingredient (c) thereon can be heated in order to dry it before the other substrate is applied. Also, ingredient (c) can optionally be applied to both substrates before bringing them together.

Step (3) can be performed by heating the composite of (a), (b), and (c), under pressure if desired, until a superior, hydrolytically-stable bond is formed.

The temperature that is required to form a superior bond varies with the nature of the organic resin and of ingredient (c). It is not possible to predict exactly what temperature will be required to cause bonding in a given system, but some specific bonding temperatures are illustrated below.

The mechanism of the bonding to the organic resin is believed to involve the cleavage of X groups from ingredient (c), creating free radicals of some sort. These radicals then react with the organic resin or rubber.

The activation temperature for most combinations of organic material and (c) is not less than 100° C., though some systems will form bonds at temperatures lower than that. It is usually desirable to heat the combination of (a), (b) and (c) at the molding temperature of any organic resin used; usually that is sufficient to cause bonding.

If resin laminates, or any other object where flow of the organic resin is permissible, are being made, the heating temperature can go above the molding point of the organic resin to near its decomposition point. Excellent bonds can be obtained in this manner, especially when heat and pressure are used in combination.

Generally, heating temperatures of no more than 275° C. are used, although higher temperatures can sometimes be used if air is kept away from the system during heating.

Step (3) can also be performed by subjecting the composite of (a), (b) and (c) to high energy radiation such as ultraviolet light or gamma radiation. Peroxide catalysts, etc. can also be added to ingredient (c) to enhance its reactivity.

The amount of radiation needed to create bonding, and the precise effect of the peroxide catalyst, varies with the combination of ingredients (a) and (c) used. It can, however, be seen that the type of energy used to create the bond is not critical.

The best time of heating or exposure to radiation is likewise variable and dependent upon the type of ingredients (a) and (c). In most cases it varies from 5 minutes to 2 hours.

The process of this invention is useful for making molding compounds, laminates, and coatings, all of which utilize a strong, hydrolytically-stable bond between an organic polymer and an inorganic substrate.

The following examples are illustrative only and should not be construed as limiting the invention which is properly delineated in the appended claims.

Example 1

Heat-cleaned 118 type E glass cloth was dipped in 0.5% water solutions of the following silanes, the solutions containing enough methanol so that they are clear.

The treated cloth was allowed to drip-dry, and was then further dried for seven minutes in a 230° F. forced-draft oven.

Laminates were prepared by laying together in alternate order 14 layers of treated glass cloth and 13 layers of polystyrene film that was 10 mils thick.

These laminates were heated to 480–500° F. at a pressure of 65 p.s.i., and then allowed to cool under pressure.

The flex and compressive strengths of these laminates were measured with the following results.

TABLE

| Coupling Agent | Flex Strength (p.s.i.) | | Compressive Strength (p.s.i.) | |
| --- | --- | --- | --- | --- |
| | Dry | After 2 hrs. in boiling water | Dry | After 2 hrs. in boiling water |
| None | 32,800 | 20,300 | 9,100 | 5,000 |
| (CH₃O)₃SiCH₂CH₂CH₂Cl | 53,300 | 53,200 | 19,700 | 22,500 |
| (CH₃O)₃SiCH₂CH₂CH₂I | 63,500 | 58,600 | 33,200 | 27,800 |
| (C₂H₅O)₃SiCH₂Cl | 45,700 | 31,800 | 17,500 | 10,300 |
| (CH₃O)₃SiCH₂CHClCH₂Cl | 55,000 | 55,000 | 20,800 | 21,000 |
| (CH₃O)₃SiCH₂CHCH₂Cl<br>    \|<br>    CH₃ | 41,600 | 41,000 | 17,400 | 18,100 |

Example 2

The experiment of Example 1 was repeated using sheets of poly(styrene-acrylonitrile) in place of the sheets of polystyrene.

The test data was as follows:

| Coupling Agent | Flex Strength (p.s.i.) | | Compressive Strength (p.s.i.) | |
|---|---|---|---|---|
| | Dry | 2 Hr. Boil | Dry | 2 Hr. Boil |
| None | 42,900 | 29,200 | 17,200 | 11,000 |
| (CH₃O)₃Si(CH₂)₄CHBrCH₂Br | 54,500 | 49,300 | 22,700 | 22,200 |
|  (toluene solution) | 67,150 | 56,800 | 39,400 | 28,700 |
| (CH₃O)₃SiCH₂CH₂CH₂Cl | 68,800 | 66,200 | 24,900 | 22,400 |

Example 3

Laminates were prepared by dipping glass cloth in a concentrated aqueous ethanol solution of phenolic resin (Bakelite BLL 3085), drying, and then pressing the cloths together at 160° C. and 30 p.s.i. for ½ hour, with a post-cure of 16 hours at 110° C. and 8 hours at 150° C. The laminate test data was as follows:

| Coupling Agent | Flex Strength (p.s.i.) | | Compressive Strength (p.s.i.) | |
|---|---|---|---|---|
| | Dry | 2 Hr. Boil | Dry | 2 Hr. Boil |
| None | 58,400 | 28,900 | 33,300 | (¹) |
| (CH₃O)₃SiCH₂CH₂CH₂Cl | 74,700 | 62,800 | 33,700 | 27,600 |

¹ Not measured.

Example 4

The experiment of Example 3 was repeated using liquid epoxy resin with m-phenylene diamine in place of the phenolic resin solution. The laminates were used at 150° C. and 30 p.s.i. for ½ hour. The laminate test data was as follows:

| Coupling Agent | Flex Strength (p.s.i.) | | Compressive Strength (p.s.i.) | |
|---|---|---|---|---|
| | Dry | 2 Hr. Boil | Dry | 2 Hr. Boil |
| None | 71,300 | 51,700 | 61,800 | 27,400 |
| (CH₃O)₃SiCH₂CH₂CH₂Cl | 98,700 | 94,500 | 53,300 | 43,300 |
|  | 81,900 | 79,800 | 41,300 | 47,700 |

Example 5

Glass plates were treated with a 0.5 percent aqueous solution of (CH₃O)₃SiCH₂CH₂CH₂Cl and dried for 7 minutes at 115° C.

A film of polystyrene was deposited on the treated plate by means of adding a polystyrene solution and allowing the solvent to evaporate.

The adhesion of the polystyrene to the glass was poor until the coated plate was heated for 1 hour at 115° C. or briefly at 175° C. The adhesion was then considerably better than the polystyrene adhesion to untreated glass.

Upon brief further heating to 200–250° C. in a nitrogen atmosphere, the adhesion of the polystyrene to the treated glass showed further improvement.

Example 6

Various organic resin sheets and films were laminated to glass plates, some of which had been treated with chloropropyltrimethoxysilane as in Example 5. The coated glass plates were baked for several minutes at 300–350° F.

Improved adhesion of the organic resins to the treated glass plates, compared with the untreated glass plates, occurred with the following organic resins:

Nylon (polyamide of adipic acid and hexamethylene diamine)
Poly(ethylene terephthalate) "Dacron"
Polystyrene
Polyethylene
Polypropylene
Styrene-acrylonitrile copolymers
Polycarbonate resin ("Lexan")
Phenoxy resin (a high molecular weight condensate of "bis-phenol-A" and epichlorohydrin)
Polyformaldehyde ("Delrin")
Melamine resin ("Cymel 405")
Melamine-alkyd coating resin
A thermosetting acrylic-melamine resin (70% hydroxylated polymethylmethacrylate [acryloid AT–52] and 30% melamine resin [Melmac MM–55]).

Example 7

When asbestos fibers which have been treated with a 5% aqueous solution of

are laminated between sheets of ethylene propylene-cyclohexadiene rubber at 50 p.s.i. and 150° C. for ½ hour, a strong, flexible, hydrolytically stable laminate is obtained.

Example 8

When a thin film of

Br₂SiCH₂CH=CH—CH₂Cl

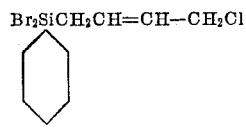

is wiped onto a molded piece of polymethyl methacrylate and allowed to stand in humid air for one-half hour, and when unvulcanized silicone rubber is firmly pressed to the treated methacrylate surface and the combination heated at 120° C. for 1 hour to vulcanize the silicone rubber, a firm, hydrolytically stable bond is formed between the silicone rubber and the resin.

Example 9

When a film of $$\begin{array}{c} C_2H_5 \\ \diagdown \\ CH_3 \diagup \end{array} CNO\underset{\underset{C_2H_5}{|}}{\overset{CH_3}{\underset{|}{Si}}}CH_2\overset{CH_3}{\underset{|}{C}}(CH_2CHICH_2I)_2$$

is placed on a steel plate, and the treated side of the plate is placed on a nylon sheet with firm pressure and heated for 2 hours at 100° C., a strong, hydrolytically-stable bond develops between the steel and the nylon.

Example 10

When 100 grams of a slurry of styrene-butadiene rubber stock in heptane is mixed with 5 grams of a heptane-soluble hydrolyzate of 4 molar parts of

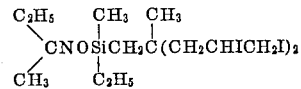

and one molar part of (C₂H₅O)₃Si(C₆H₉Br₄), and 20 grams of highly powdered silica; and the solvent is allowed to evaporate with stirring until the mixture resembles a paste; and when this is molded and heated for 1 hour at 100° C. in a forced-air oven, a structure of high strength, flexibility, and hydrolytic stability is formed.

Example 11

A firm bond between granite and polymethylmethacrylate is formed when the granite surface is treated with a hydrolyzate of a silane of the formula CH₃COOSi(CH₂CH₂CH₂Br)₃, the hydrolyzate is allowed to dry, and the polymethylmethacrylate and granite are placed together and heated for 1 hour at 110° C.

Example 12

(a) A 2½ x 4 inch Pyrex glass plate was treated with 0.5% aqueous solution of ClCH₂CH₂CH₂Si(OCH₃)₃ and dried briefly in a 100° C. oven.

(b) Another sample of Pyrex glass was treated with a 0.5% solution of ClCH₂CH₂CH₂SiCl₃ in toluene and dried in a similar manner.

On each glass plate was laid a sheet of compounded styrene-butadiene rubber tread stock. These were then pressed at 1500 p.s.i. and 320° F. for 20 minutes.

These composites were tested for the force required to remove the rubber sheets by a vertical pull. The force required to pull (a) apart was 500 grams, and for (b) was over 500 grams. The force required to separate similar, untreated Pyrex glass-rubber composites was 170 grams.

That which is claimed is:

1. The process of bonding:
   (a) an organic polymer from the group consisting of resin polymers and rubber polymers to
   (b) an inorganic substrate comprising:
      (1) applying to the surface of at least one of (a) and (b), a material
   (c) selected from the group consisting of compounds of the formula $$R'_n Si(QX_m)_a$$
   $$R_b$$

and hydrolyzates thereof where R is a monovalent hydrocarbon radical of no more than six carbon atoms, R' is a hydrolyzable group selected from the group consisting of alkoxy, alkoxyalkoxy, acyloxy, dialkyl-substituted isocyanoxy and isocyanate, Q is an organic radical composed of carbon and hydrogen atoms or carbon, hydrogen, and oxygen atoms, and having a valence of $m+1$, Q being bonded to the silicon atom by a silicon-carbon bond, X is selected from the group consisting of chlorine, bromine, and iodine atoms which are attached to saturated carbon atoms, $n$ has a value of 1 to 3, $m$ has a value of at least 1, $b$ has an average value of 0 to 2, and $a$ has an average value of 0.1 to 3, the sum of $a$, $b$ and $n$ being 4, and the carbon atoms in Q which are alpha and beta to a silicon atom being each bonded to no more than one X atom,
      (2) bringing (a) and (b) into contact with each other with (c) between them,
      (3) applying radiant energy to the composite of (a), (b), and (c) until a bond is formed between them which is superior in strength and hydrolytic stability to the bond between (a) and (b) alone.

2. The process of claim 1 where (b) is silicone rubber.
3. The process of claim 1 where (a) is a thermoplastic resin.
4. The process of claim 1 where (a) is polystyrene.
5. The process of claim 1 where (a) is poly(styrene-acrylonitrile).
6. The process of claim 1 where (a) is polymethylmethacrylate.
7. The process of claim 1 where (a) is polyethylene.
8. The process of claim 1 where $QX_m$ is —CH₂CH₂CH₂Cl 9. The process of claim 1 where $QX_m$ is

—CH₂CH₂CH₂I

10. The process of claim 1 where $QX_m$ is

—CH₂CHClCH₂Cl

11. The process of claim 1 where $QX_m$ is $$-CH_2\overset{CH_3}{\underset{|}{C}}HCH_2Cl$$

12. The process of claim 1 where $QX_m$ is

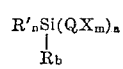

13. The process of claim 1 where (c) is (CH₃O)₃SiCH₂CH₂CH₂Cl

14. The process of claim 1 where (c) is (CH₃O)₃SiCH₂CH₂CH₂I

15. The process of claim 1 where (c) is (CH₃O)₃SiCH₂CHClCH₂Cl

16. The process of claim 1 where $n$ has a value of 3.
17. An article of manufacture consisting essentially of:
    (a) a solid, organic polymer from the group consisting of resin polymers and rubber polymers bonded to
    (b) a solid, inorganic substrate, there being between (a) and (b) at their points of contact a material selected from the group consisting of
    (c) compounds of the formula $$R'_n Si(QX_m)_a$$
    $$R_b$$

and hydrolyzates thereof, where R is a monovalent hydrocarbon radical of no more than six carbon atoms, R' is a hydrolyzable group selected from the group consisting of alkoxy, alkoxyalkoxy, acyloxy, dialkyl-substituted isocyanoxy and isocyanate, Q is an organic radical composed of carbon and hydrogen atoms or carbon, hydrogen, and oxygen atoms, and having a valence of $m+1$, Q being bonded to the silicon atom by a silicon-carbon bond, X is selected from the group consisting of chlorine, bromine, and iodine atoms which are attached to saturated carbon atoms, $n$ has a value of 1 to 3, $m$ has a value of at least 1, $b$ has an average value of 0 to 2, and $a$ has an average value of 0.1 to 3, the sum of $a$, $b$ and $n$ being 4, and the carbon atoms in Q which are alpha and beta to a silicon atom being each bonded to no more than one X atom.

18. An article in accordance with claim 17 in which (a) is an organic resin and (b) is a glass fabric.
19. An article in accordance with claim 17 in which (a) is an organic resin and (b) is glass fibers.
20. An article in accordance with claim 17 in which (a) is an organic resin and (b) is silica powder.

References Cited

UNITED STATES PATENTS 3,223,577  12/1965  Plueddemann _____ 161—193

ROBERT F. BURNETT, *Primary Examiner.*

W. J. VAN BALEN, *Assistant Examiner.*